(12) United States Patent
Kataoka (10) Patent No.: US 9,475,544 B2
(45) Date of Patent: Oct. 25, 2016

(54) BICYCLE

(71) Applicant: Katayama Kogyo Co., Ltd., Ibara-Shi (JP)

(72) Inventor: Noboru Kataoka, Kasaoka (JP)

(73) Assignee: Katayama Kogyo Co., Ltd., Ibara-Shi (JP)

( * ) Notice: Subject to any disclaimer, the term of this patent is extended or adjusted under 35 U.S.C. 154(b) by 0 days.

(21) Appl. No.: 14/687,279

(22) Filed: Apr. 15, 2015

(65) Prior Publication Data

US 2015/0217832 A1 Aug. 6, 2015

Related U.S. Application Data

(63) Continuation of application No. PCT/JP2013/078025, filed on Oct. 16, 2013.

(30) Foreign Application Priority Data

Oct. 24, 2012 (JP) ................................ 2012-234806

(51) Int. Cl.
*B62M 1/26* (2013.01)
*B62M 1/28* (2013.01)
*B62K 3/00* (2006.01)

(52) U.S. Cl.
CPC ............... *B62M 1/26* (2013.01); *B62K 3/002* (2013.01); *B62M 1/28* (2013.01); *B62K 2204/00* (2013.01)

(58) Field of Classification Search
CPC .......... B62M 1/24; B62M 1/26; B62K 3/002
USPC ............ 280/210, 218, 252, 253, 281.1, 282, 280/288.4, 228
See application file for complete search history.

(56) References Cited

U.S. PATENT DOCUMENTS

| | | | |
|---|---|---|---|
| 2010/0320716 A1 | 12/2010 | Sung | |
| 2011/0057411 A1* | 3/2011 | Scolari et al. | 280/221 |
| 2011/0193311 A1 | 8/2011 | Chou | |
| 2011/0224047 A1* | 9/2011 | Sans | 482/51 |

FOREIGN PATENT DOCUMENTS

| | | |
|---|---|---|
| JP | 3144223 U | 8/2008 |
| JP | 2010-260457 A1 | 11/2010 |
| JP | 2011-001052 A1 | 1/2011 |

OTHER PUBLICATIONS

International Search Report (Application No. PCT/JP2013/078025) dated Jan. 14, 2014.

* cited by examiner

*Primary Examiner* — Joseph Rocca
*Assistant Examiner* — Felicia L Brittman
(74) *Attorney, Agent, or Firm* — Burr & Brown, PLLC (57) ABSTRACT

A bicycle includes: a frame that supports a front wheel and a rear wheel; a pair of up-and-down links that are respectively provided on a right side and a left side of the frame in a front view; a pair of pedals that are respectively supported by the pair of up-and-down links; and a drive unit that drives the rear wheel. A front end of each of the pair of up-and-down links is pivotally attached to the frame, and a rear end of each of the pair of up-and-down links is respectively connected to each of the pair of pedals. The drive unit includes a pair of crank arms that are arranged point-symmetrically at an angle of 180° in a front view, and a force that depresses each of the pair of pedals so that the pair of pedals alternately swing is transmitted to the pair of crank arms through the pair of up-and-down links. The bicycle further includes a horizontally-holding mechanism that holds each of the pair of pedals approximately horizontally while rotating of each of the pair of up-and-down links.

4 Claims, 11 Drawing Sheets

BICYCLE

CROSS REFERENCE TO RELATED APPLICATION

This application is a continuation of International Patent Application No. PCT/JP2013/78025, having an international filing date of Oct. 16, 2013, which designated the United States, the entirety of which is incorporated herein by reference. Japanese Patent Application No. 2012-234806 filed on Oct. 24, 2012 is also incorporated herein by reference in its entirety.

BACKGROUND OF THE INVENTION

1. Field of the Invention

The present invention relates to a bicycle. In particular, the invention relates to a transmission mechanism that transmits a driving force that has swung each pedal in the vertical direction.

A bicycle is normally designed so that the user (rider) sits on the saddle, and operates the right pedal and the left pedal (that are connected directly to the free end of a crank arm) with the right foot and the left foot.

Since the structure in which each pedal is connected directly to the free end of the crank arm requires the user to operate each pedal so that each pedal draws a large circle, the user must alternately bend and stretch the right knee and the left knee to a large extent.

2. Description of Related Art

Japanese Utility Model No. 3144223 discloses a bicycle that allows the user to stand and pedal the bicycle by alternately swinging the right pedal and the left pedal in the vertical direction.

However, since the bicycle disclosed in Japanese Utility Model No. 3144223 has a structure in which the front end of the arm that extends forward from the pedal is pivotally attached to the frame, the rear end of the pedal extends diagonally upward, and the upper side of the pedal slopes forward in a state in which the pedal has been moved upward. Therefore, the user cannot operate the pedals as if to walk.

JP-A-2010-260457 discloses a structure in which a pedal that is formed in the shape of the letter "T" is rotatably connected to the free end of a pedal arm through a pedal rotary shaft. However, the structure disclosed in JP-A-2010-260457 lacks stability since the user must hold each pedal horizontally with the bottom of each loot, and requires a complex transmission mechanism using a chain. Therefore, the structure disclosed in JP-A-2010-260457 is not practical.

SUMMARY OF THE INVENTION

An object of one aspect of the invention is to provide a bicycle that allows the user to easily operate the pedals, and ride it as if to walk.

According to one aspect of the invention, there is provided a bicycle comprising:

a frame that supports a front wheel and a rear wheel;

a pair of up-and-down links that are respectively provided on a right side and a left side of the frame in a front view;

a pair of pedals that are respectively supported by the pair of up-and-down links; and a drive unit that drives the rear wheel, wherein a front end of each of the pair of up-and-down links is pivotally attached to the frame, and a rear end of each of the pair of up-and-down links is respectively connected to each of the pair of pedals, wherein the drive unit includes a pair of crank arms that are arranged point-symmetrically at an angle of 180° in a front view, wherein a force that depresses each of the pair of pedals so that the pair of pedals alternately swing downward is transmitted to the pair of crank arms through the pair of up-and-down links, and wherein the bicycle further comprises a horizontally-holding mechanism that holds each of the pair of pedals approximately horizontally while rotating of each of the pair of up-and-down links.

The term "frame" used herein in connection with one aspect of the invention refers to a frame that supports a front wheel and a rear wheel. One aspect of invention may be applied to a bicycle that has one front wheel and one rear wheel, but is preferably applied to a three-wheeled bicycle that has one front wheel and two rear wheels since such a three-wheeled bicycle allows the user to easily get on and get off, and ride it as if to walk.

A bicycle is normally designed so that the user alternately operates each pedal attached to the free end of a crank arm with the right foot and the left foot. On the other hand, the bicycle according to one aspect of the invention has a structure in which the front end of each of the pair of arm-shaped right and left up-and-down links that extend in the forward-backward direction is pivotally attached to the frame, and each pedal is provided on the rear end of each of the pair of up-and-down links so that the right up-and-down link and the left up-and-down link alternately swing in the vertical direction.

The pair of crank arms are provided to the drive unit of the bicycle, and the force that alternately operates the pair of pedals downward is transmitted to the pair of crank arms through the pair of up-and-down links to rotate the drive shaft.

Therefore, since the downward pressing force applied to the up-and-down link is converted into rotational force through the pair of crank arms of the drive unit, the user can advance the bicycle by merely operating the right pedal and the left pedal with the right foot and the left foot so that the right pedal and the left pedal alternately swing in the vertical direction.

In this case, the pair of up-and-down links rotate around an attachment section situated at the front end so that the rear end draws an arc. In one aspect of the invention, the horizontally-holding mechanism holds the pair of pedals horizontally so that the upper side of each of the pair of pedals is always maintained approximately horizontally.

In the bicycle, the horizontally-holding mechanism may include a pair of pedal support links that are respectively set up on the pair of pedals, and a pair of horizontally-holding links, the rear end of each of the up-and-down links may be pivotally attached to each of the pair of pedal support links at a halfway position, an upper end of each of the pair of pedal support links may be pivotally attached to one end of each of the pair of horizontally-holding links, and the other end of each of the pair of horizontally-holding links may be pivotally attached to the frame.

Such a link mechanism makes it possible to fold the pair of up-and-down links and the pair of horizontally-holding links so that the pair of pedal support links move toward a handle shaft. In the bicycle, the pair of horizontally-holding links may be biased in an extension direction, and may be extendable so that the pair of pedals can be rotated upward, and folded.

Since the bicycle according to one aspect of the invention is designed so that the upper side of each of the pair of pedals is maintained approximately horizontally when each of the pair of pedals swings in the vertical direction, it is possible to allow the user to pedal the bicycle as if to walk.

The pedal can be folded by utilizing a link mechanism as a pair of horizontally-holding mechanisms.

DETAILED DESCRIPTION OF THE INVENTION

A bicycle 10 according to exemplary embodiments of the invention is described below with reference to the drawings. Note that the invention is not limited to the following exemplary embodiments.

The structure according to the exemplary embodiments of the invention may also be applied to a two-wheeled bicycle that has one front wheel and one rear wheel.

Figure 1:
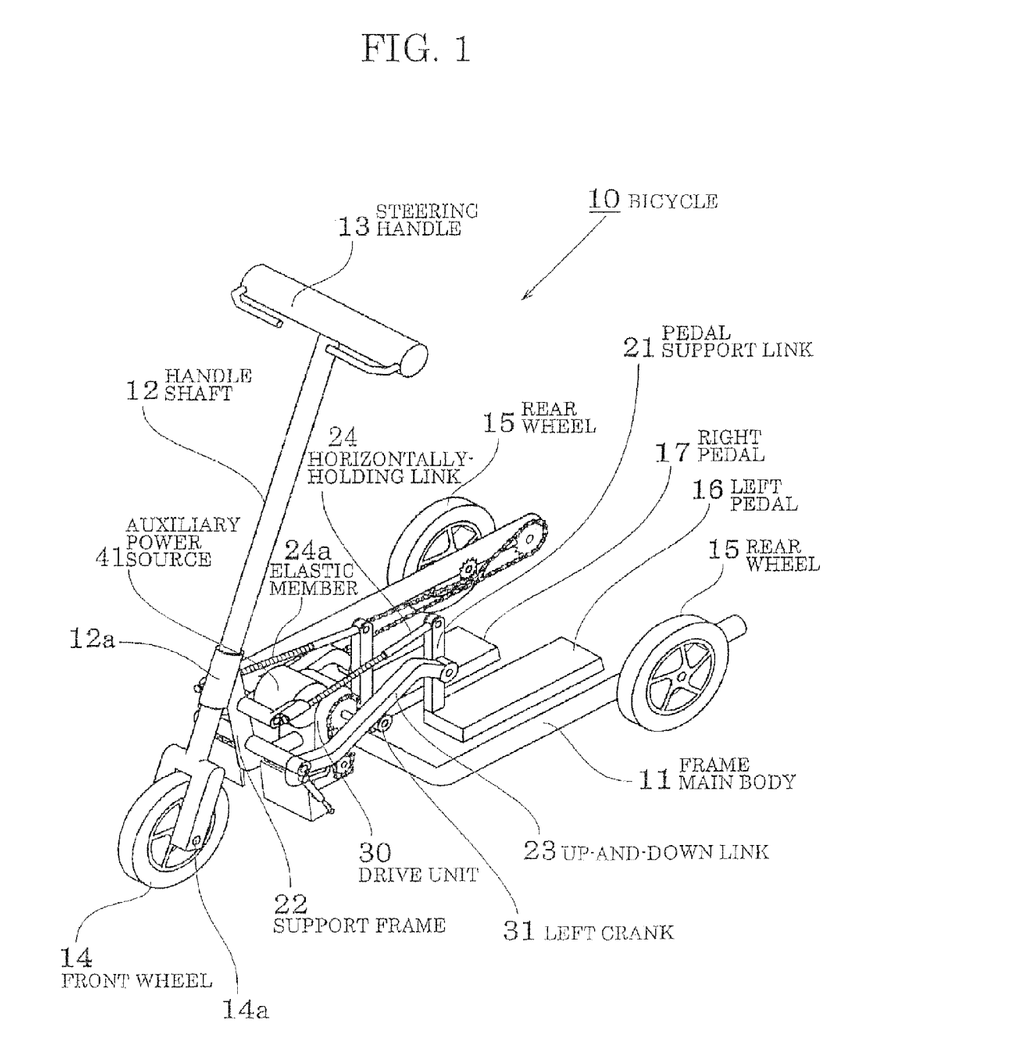
FIG. 1 schematically illustrates the structure of a bicycle according to a first embodiment of the invention.

FIG. 1 (first embodiment) illustrates an example of a three-wheeled bicycle that has one front wheel and two rear wheels.

The bicycle 10 illustrated in FIG. 1 includes a drive unit 30 that is provided on the front side of a frame main body 11 that is formed approximately in the shape of the letter "U" in a plan view. A handle shaft 12 and a steering handle 13 are supported by a support frame 22 that is set up on the frame main body 11.

In the example illustrated in FIG. 1, the handle shaft 12 is inserted into (supported by) a support pipe 12a connected to the support frame 22. Note that the handle shaft 12 may be mounted in an arbitrary way. A front wheel 14 is pivotally attached to the lower end of the handle shaft 12.

Note that a brake wire and the like are omitted in FIG. 1.

A left pedal 16 and a right pedal 17 (i.e., a pair of right and left pedals) are provided (situated) inside the frame main body 11. The user (rider) stands and pedals the bicycle 10 while placing the feet on the left pedal 16 and the right pedal 17.

In FIG. 1, a cover that covers the transmission mechanism such as the drive unit 30 and a chain is omitted so that the structure of the bicycle 10 can be readily understood.

A link mechanism for the pedals 16 and 17 is described below.

The left pedal 16 and the right pedal 17 alternately swing in the vertical direction. The link mechanism is common to the left pedal 16 and the right pedal 17, and is indicated using common reference signs.

Figure 2:
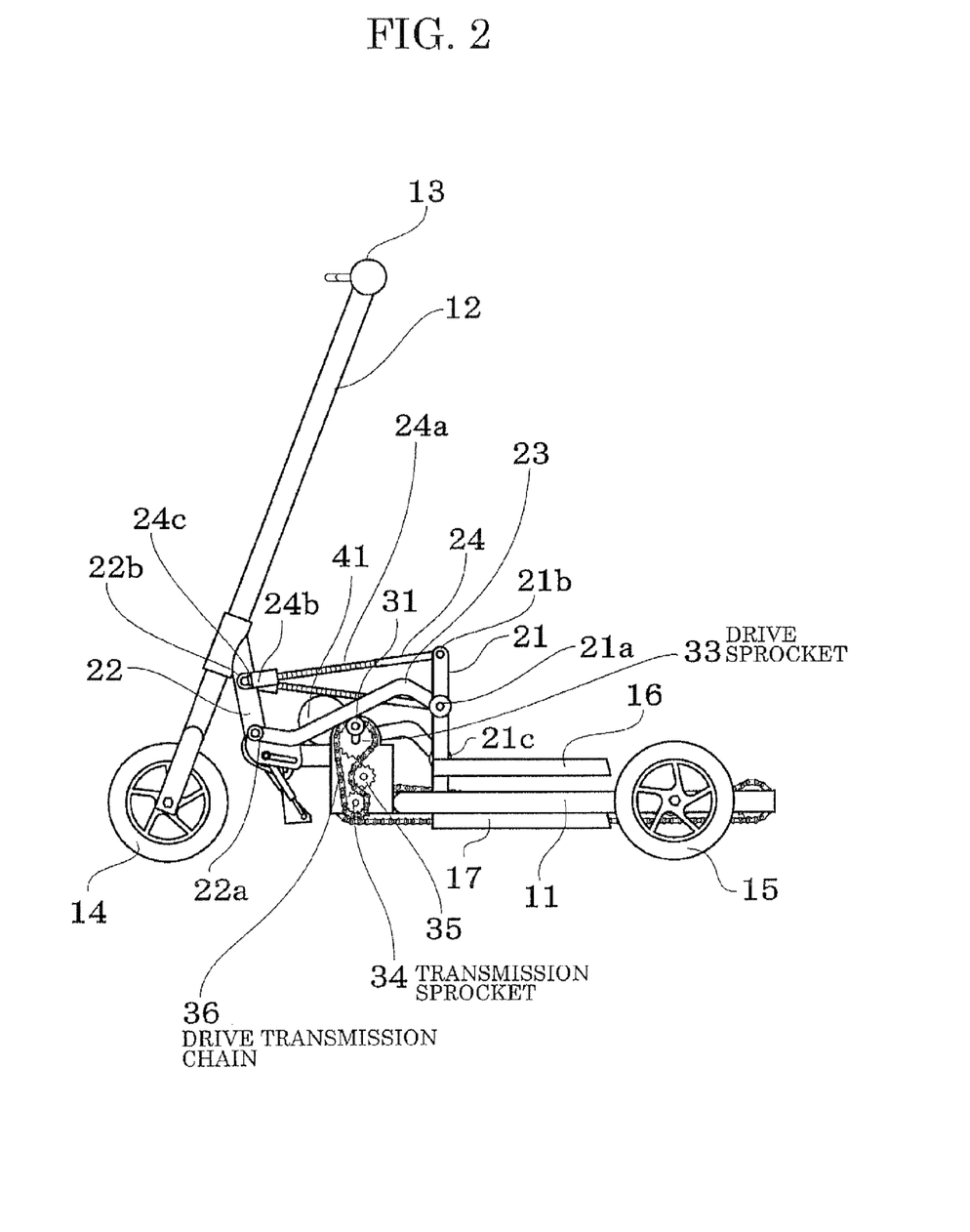
FIG. 2 is a side view illustrating a bicycle.

As illustrated in FIGS. 1 and 2, a pair of pedal support links 21 are respectively set up on the upper side of the front part each of the pedals 16 and 17. One of the pair of pedals 16 and 17 and one of the pair of pedal support links 21 are arranged approximately in the shape of the letter "L" in a side view.

As illustrated in FIG. 2, the rear end of each of a pair of up-and-down links 23 is pivotally attached to an attachment section 21a of each of the pair of pedal support links 21 that is situated between a pedal-side base 21c and an upper end 21b, and the front end of each of the pair of up-and-down links 23 is pivotally attached to an attachment section 22a of the support frame 22.

The upper end (attachment section) 21b of each of the pair of pedal support links 21 is pivotally attached to the rear end of each of a pair of horizontally-holding links 24, and the front end of each of the pair of horizontally-holding links 24 is pivotally attached to an attachment section 22b of the support frame 22 through a bracket 24b having a tubular part.

The front end of each of the pair of horizontally-holding links 24 is inserted into the tubular part of the bracket 24b so as to be slidable in the forward-backward direction.

The front end of each of the pair of horizontally-holding links 24 has a retaining head 24c that prevents the horizontally-holding link 24 from falling from the bracket 24b, and each of the pair of horizontally-holding links 24 is biased backward using an elastic member 24a such as a spring.

Since the pair of horizontally-holding links 24 is extendable, the interval between the attachment section 22b and the attachment section 21b is variable.

Figure 3A:
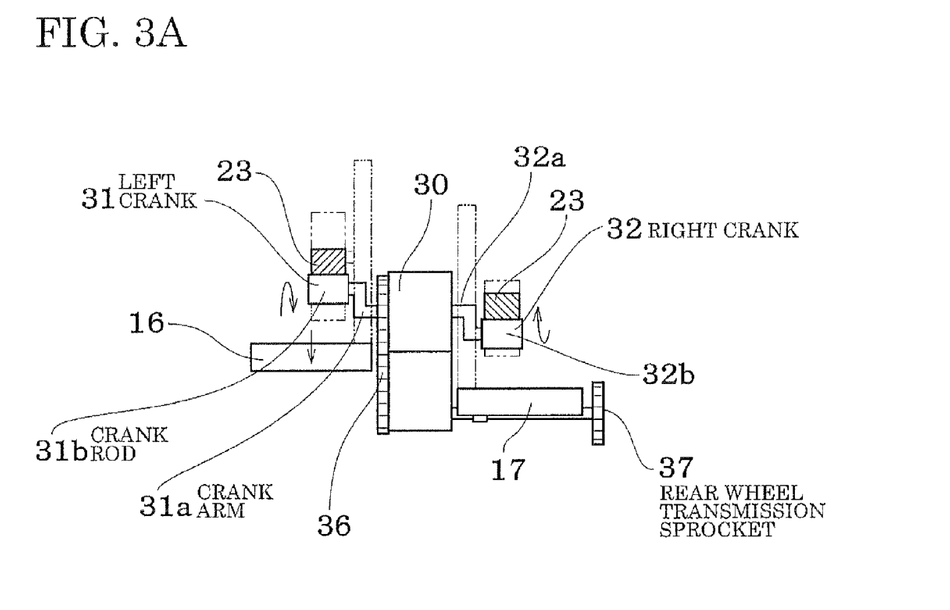
FIGS. 3A and 3B are views illustrating a drive unit of a bicycle when a pair of pedals are alternately operated (depressed).
Figure 3B:
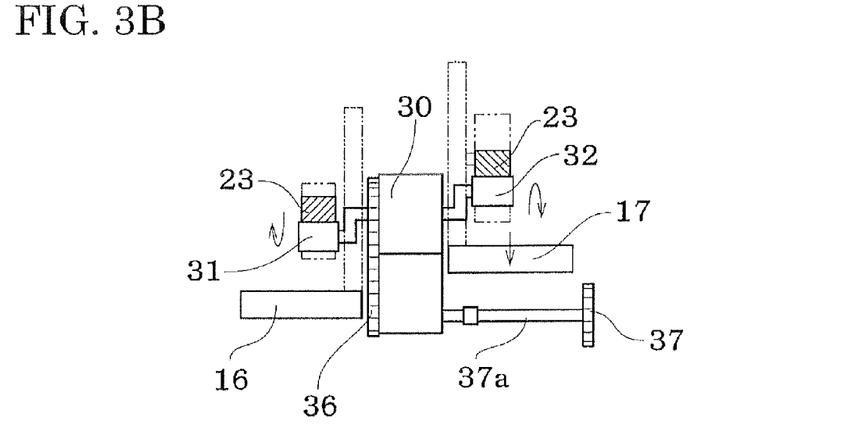

As illustrated in FIGS. 3A and 3B, the drive unit 30 includes crank mechanisms 31 and 32, and includes a pair of crank arms 31a and 32a that are arranged point-symmetrically at an angle of 180° in a front view (or a rear view), and a pair of crank rods 31b and 32b that extend in the horizontal direction from the free end of either of the pair of crank arms 31a and 32b.

The crank mechanism that is situated on the side of the left pedal 16 is referred to as a left crank 31, and the crank mechanism that is situated on the side of the right pedal 17 is referred to as a right crank 32, for convenience of explanation.

Figure 5A:
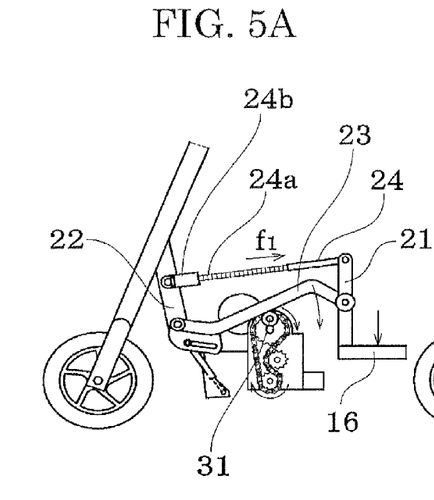
FIGS. 5A and 5B are side views illustrating a bicycle, and illustrate a motion when a pedal situated on the front side is operated (depressed)

As illustrated in FIGS. 3A and 5A, when the left pedal 16 is operated (depressed) downward from the uppermost position, the crank rod 31b of the left crank 31 is pressed downward.

Figure 5B:
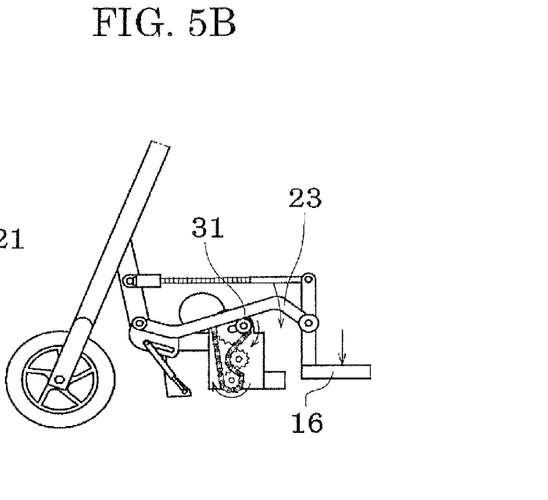
Figure 5C:
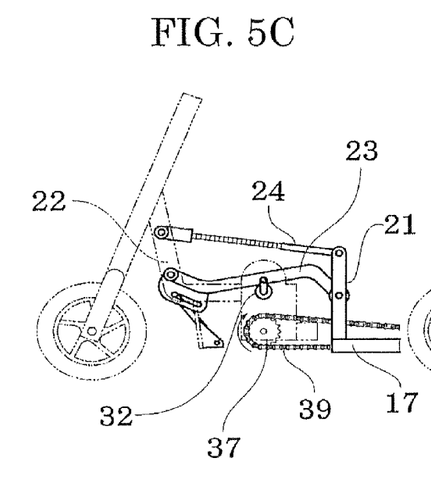
FIGS. 5C and 5D illustrate the motion of a pedal situated on the back side.

The crank rod 32b of the right crank 32 is situated at the lowermost position in this state (see FIGS. 3A and 5C).

Since the up-and-down link 23 rotates around the attachment section 22a situated at the front end, the left crank 31 rotates clockwise (see FIGS. 5A and 5B).

Figure 6A:
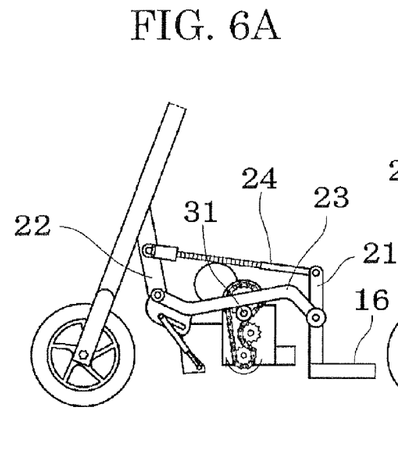
FIGS. 6A and 6B are side views illustrating a bicycle, and illustrate the motion of a pedal situated on the front side.
Figure 6B:
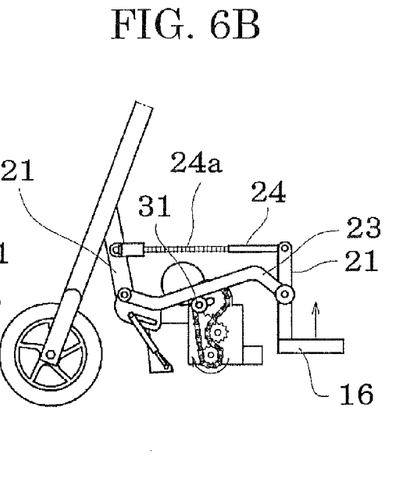

When the left crank 31 has further rotated, the crank rod 31b of the left crank 31 is situated at the lowermost position (see FIGS. 3A and 6A).

Figure 5D:
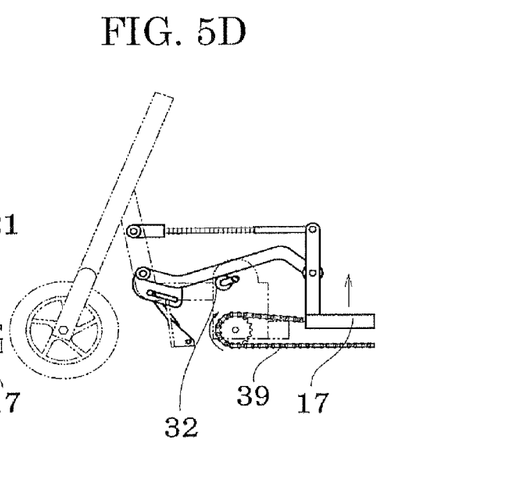

In this case, the right crank 32 is situated at the uppermost position (see FIG. 6C) through the positions illustrated in FIGS. 5C and 5D.

Figure 6C:
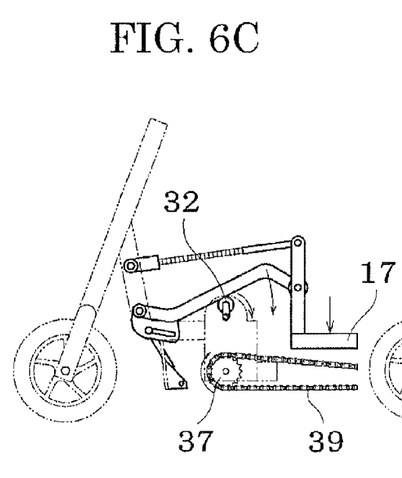
FIGS. 6C and 6D illustrate a motion when a pedal situated on the back side is operated (depressed).
Figure 6D:
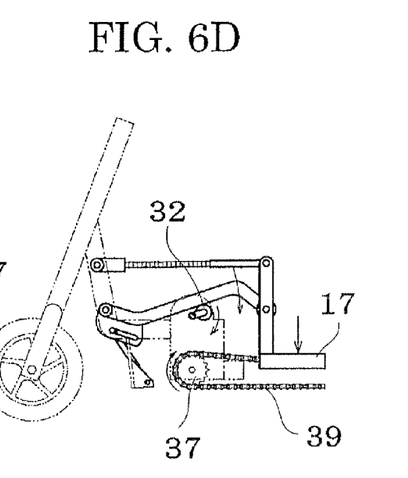

When the right pedal 17 is then operated (depressed), the crank rod 32b of the right crank 32 is pressed downward (see FIGS. 6C and 6D).

The above operation is repeated, and the swing motion of the up-and-down link 23 in the vertical direction is converted into rotational force through the crank mechanism of the drive unit 30.

Since the bicycle 10 includes the link structure that links the upper end of each of the pair of pedal support links 21 (that are respectively set up on the left pedal 16 and the right pedal 17) to the support frame 22 using each of the pair of horizontally-holding links 24, the upper side of each of the left pedal 16 and the right pedal 17 is maintained approximately horizontally in spite of the rotational motion of each of the pair of up-and-down links 23.

In particular, since the front end of each of the pair of horizontally-holding links 24 is slidably supported through the bracket 24b, and each of the pair of horizontally-holding links 24 is biased in the extension direction using the elastic member 24a, each of the pair of horizontally-holding links 24 is extendable.

Therefore, since the left pedal 16 and the right pedal 17 can be maintained horizontally while absorbing a change in position that occurs when the left pedal 16 and the right pedal 17 are operated, it is possible to ensure that the left pedal 16 and the right pedal 17 can be operated smoothly.

Figure 7A:
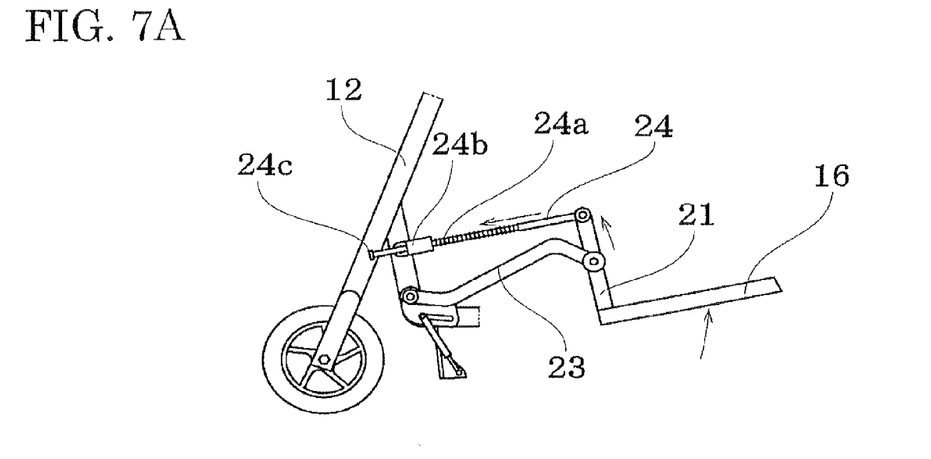
FIG. 7A to 7C illustrate a pedal folding process.
Figure 7B:
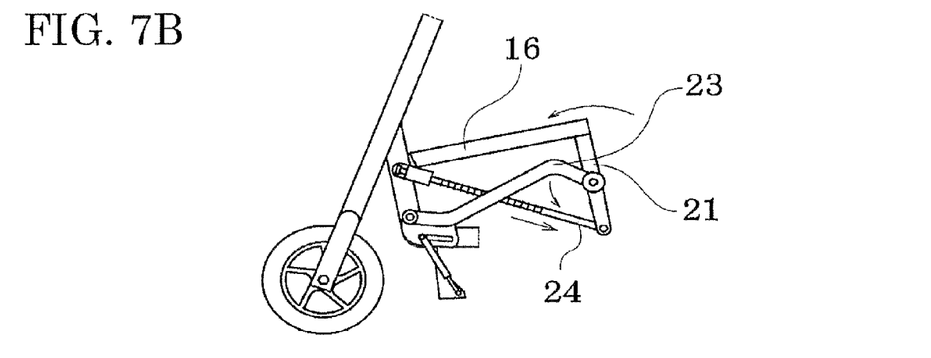
Figure 7C:
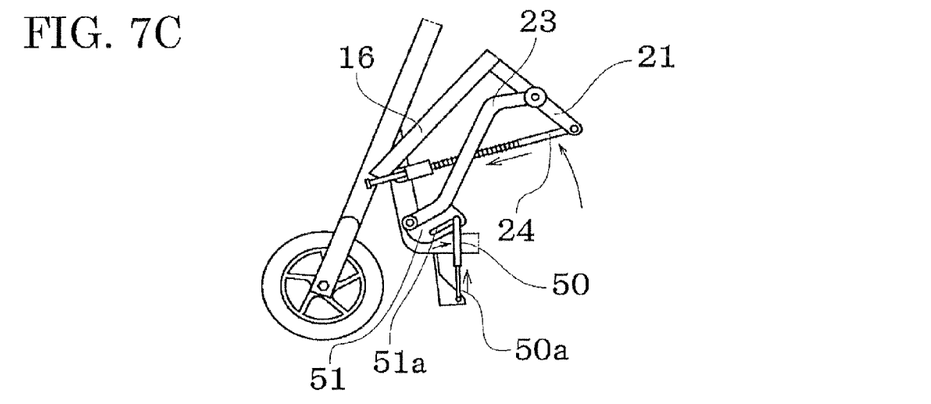

The above link structure also makes it possible to fold the pair of pedals by rotating the pair of pedals upward as illustrated in FIGS. 7A to 7C.

FIG. 7A illustrates an example in which the left pedal 16 has been moved upward. In this case, since the horizontally-holding link 24 moves forward against the biasing force applied by the elastic member 24a, the interval between the support frame 22 and the upper end of the pedal support link 21 decreases.

The pedal 16 is then folded so that the horizontally-holding link 24 crosses the up-and-down link 23 (see FIG. 7B).

In the first embodiment, a slide bracket 51 is provided at the front end of the up-and-down link 23. A long hole 51a that extends in the forward-backward direction is formed in the slide bracket 51, and a pusher 50 is provided so that the upper end of the pusher 50 can slide along the long hole 51a.

Therefore, the pedal 16 can be further folded forward by extending a rod 50a of the pusher 50 (see FIG. 7C).

As illustrated in FIG. 2, the rotational force due to the left crank 31 and the right crank 32 of the drive unit 30 is transmitted from a drive sprocket 33 that is secured on (connected to) the crank arms 31b and 32b (see FIG. 3) to a transmission sprocket 34 through a drive transmission chain 36, for example.

Note that an adjustment sprocket 35 for adjusting the tension of the drive transmission chain 36 may also be provided, if necessary.

Figure 4:
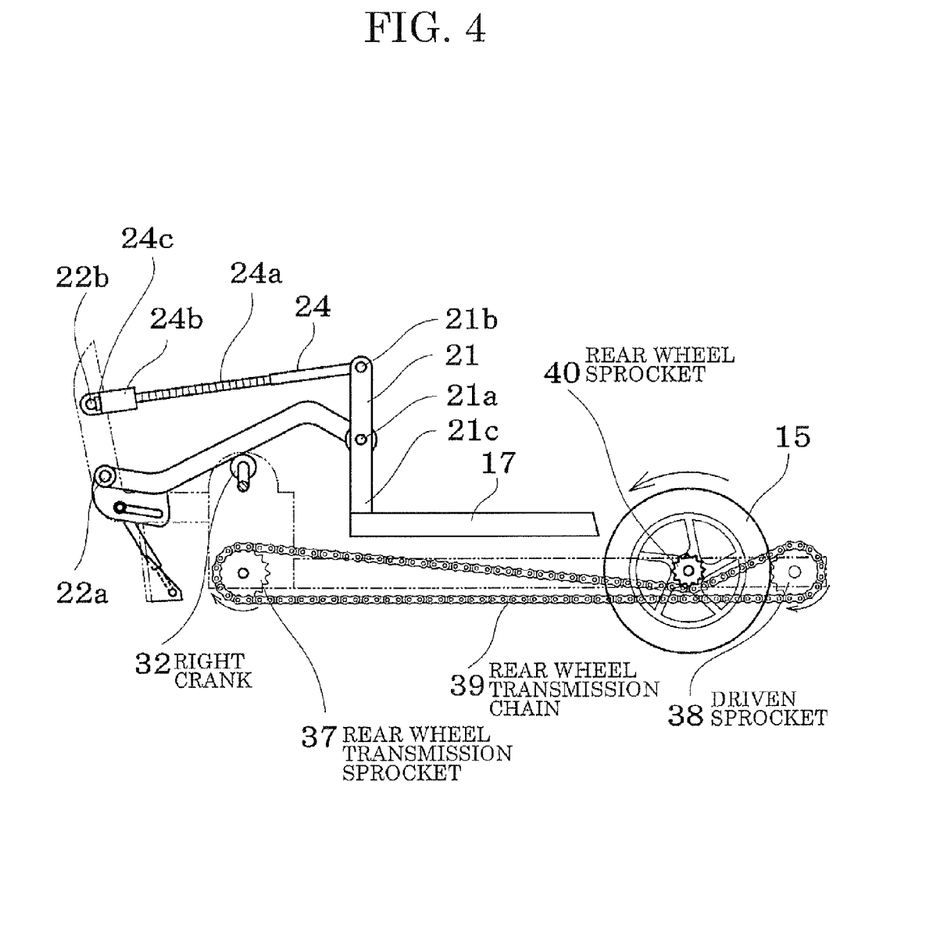
FIG. 4 is a view illustrating a rear wheel rotation mechanism.

The rotational force of the transmission sprocket 34 is transmitted to a rear wheel transmission sprocket 37 through a transmission shaft 37a (see FIG. 3B and FIG. 4).

In this case, since the rear end of each of the pair of up-and-down links 23 is rotated (moved) in the vertical direction, the rear wheel transmission sprocket 37 rotates clockwise (see the arrow in FIG. 4). Therefore, if the rotational force is transmitted directly to the rear wheel 15 through a chain or the like, the rear wheel 15 rotates in the direction opposite to the travel direction.

Therefore, a rear wheel transmission chain 39 is provided to engage the rear wheel transmission sprocket 37 and a driven sprocket 38 so that a rear wheel sprocket 40 engages the upper part of the rear wheel transmission chain 39 (see FIG. 4).

This makes it possible to easily reversely rotate the rear wheel 15 in the travel direction of the bicycle.

As illustrated in FIG. 1, an auxiliary power source 41 such as an electric motor may be connected to the drive unit 30 of the bicycle 10.

FIGS. 8 to 11 illustrate an example of a bicycle according to a second embodiment.

The same elements as those described above in connection with the first embodiment are indicated by the same reference signs.

Figure 8:
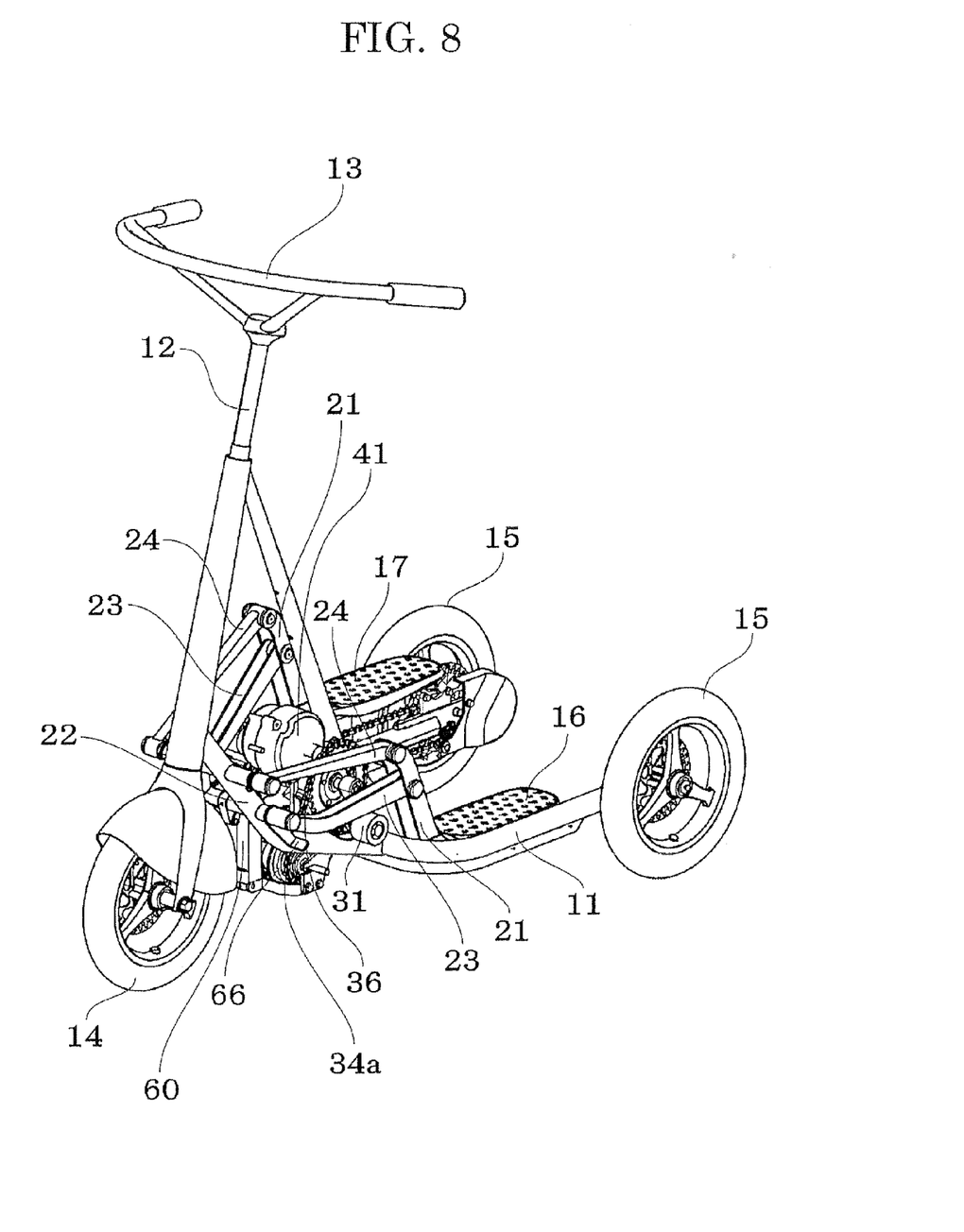
FIG. 8 is a perspective view illustrating a bicycle according to a second embodiment.
Figure 9:
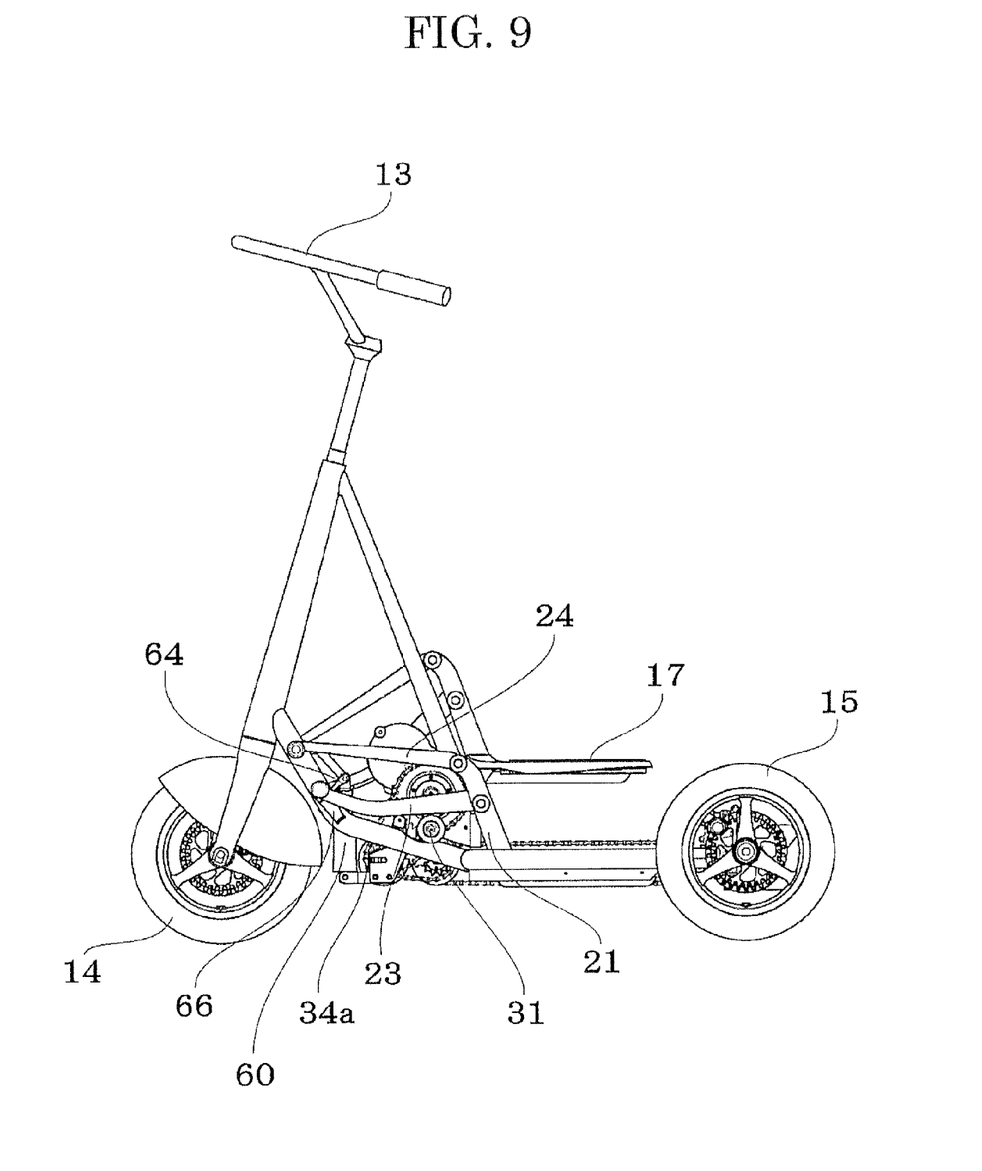
FIG. 9 is a side view illustrating a bicycle according to a second embodiment.

In the second embodiment, a transmission gear mechanism 34a is provided between the drive unit and the transmission sprocket 34.

The bicycle according to the second embodiment is designed so that the user can walk while forcing the bicycle forward by moving the pedals 16 and 17 toward the handle shaft.

Note that FIGS. 8 and 9 illustrate a state in which a chain cover is removed.

The structure of the auxiliary mechanism is described below with reference to FIG. 10.

Figure 10:
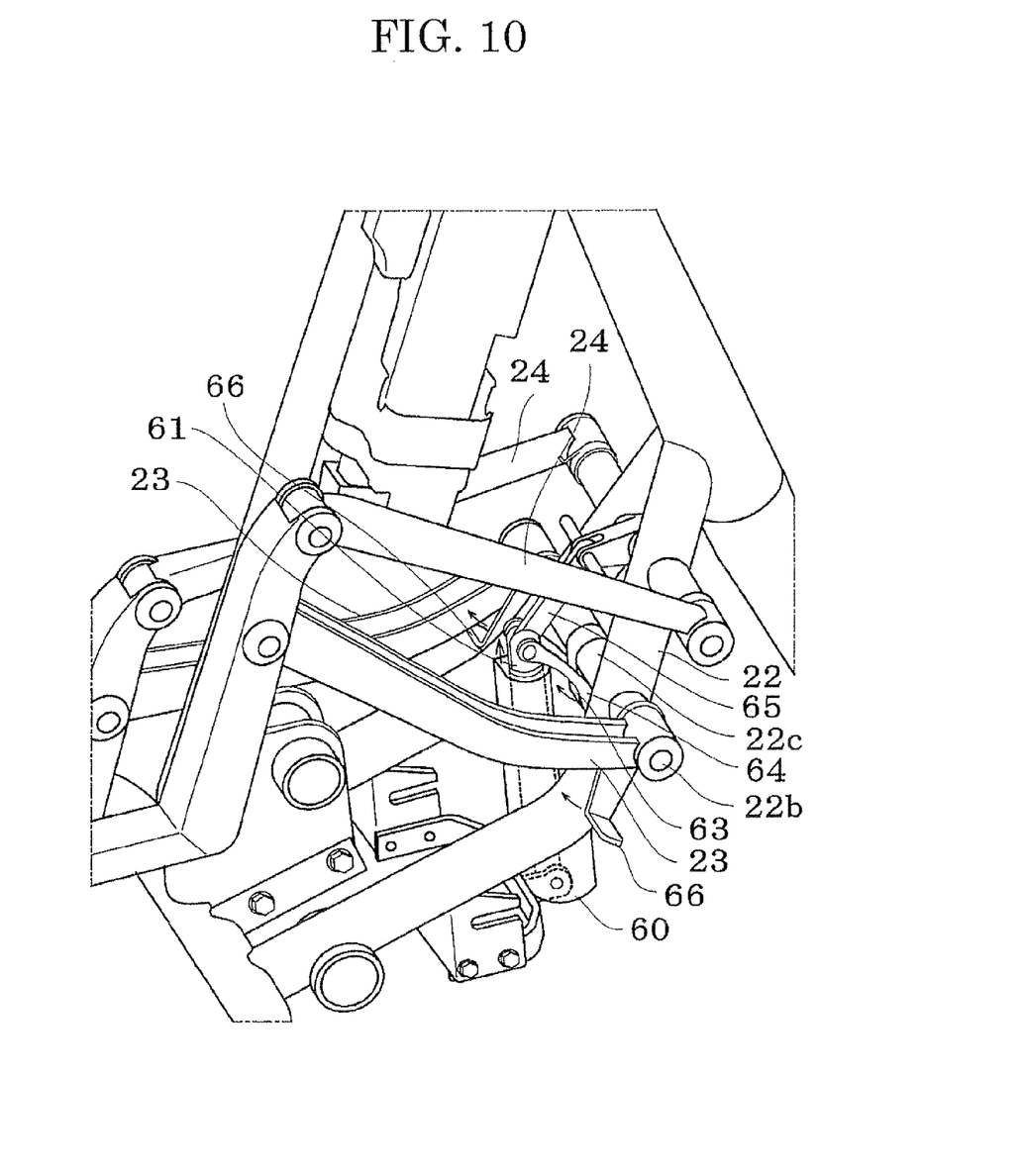
FIG. 10 illustrates an up-and-down link auxiliary mechanism.

FIG. 10 mainly illustrates the frame and the link mechanism.

An electric actuator 60 is set up on the lower part of a support frame 22 (that is approximately in the shape of the letter "L" in a side view, and is approximately in the shape of a triangle in a plan view), and a piston 61 is linked to an auxiliary drive shaft 22c provided inside a horizontal auxiliary frame 22b using a first link 63 and a second link 64 approximately in the shape of the letter "V".

The upper end of the piston 61 is linked to the upper part of the support frame 22 using a sub-link 65.

A pair of right and left flip-up brackets 66 are secured on (coupled to) the auxiliary drive shaft 22c.

When the electric actuator 60 has been operated, and the piston 61 has been moved upward while being supported by the sub-link 65, the second link 64 also moves upward.

Therefore, the first link 63 rotates clockwise, and the flip-up bracket 66 secured on the auxiliary drive shaft 22c also rotates clockwise (see FIG. 10).

Figure 11:
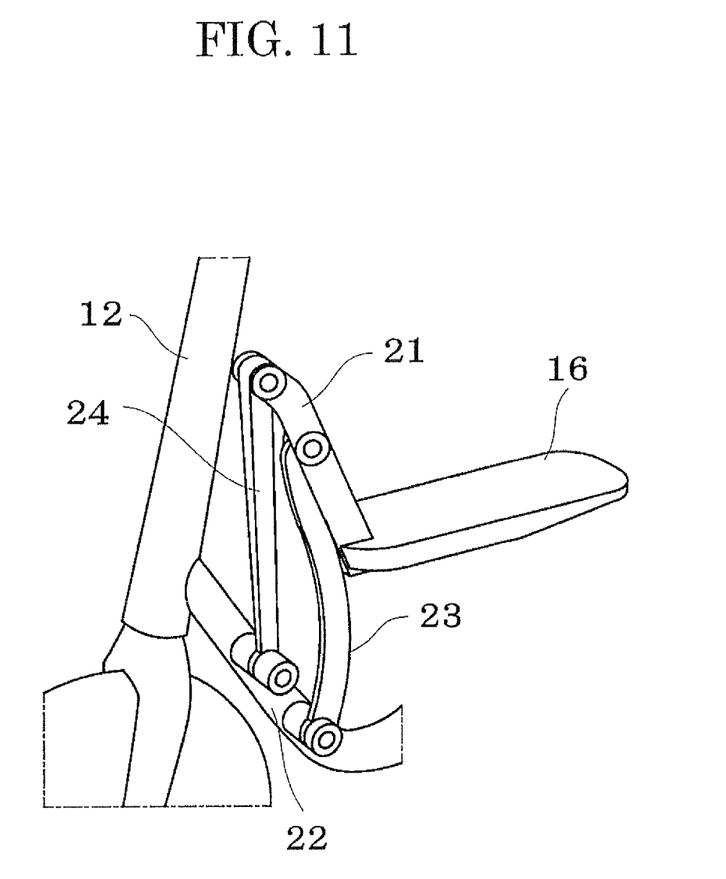
FIG. 11 illustrates a state in which an up-and-down link and a horizontally-holding link have been folded upward, and a pedal has been moved toward a handle shaft.

The flip-up bracket 66 pushes the up-and-down link 23 from the lower side, and assists in folding the up-and-down link 23 and the horizontally-holding link 24 toward the handle shaft 12 (see FIG. 11).

Since the auxiliary drive shaft 22c is connected to the rear end of the pair of up-and-down links 23 through a needle bearing, the pair of up-and-down links 23 rotate freely.

When the pedals have been moved toward the handle shaft 12 (see FIG. 11), the user can walk while holding the steering handle in a state in which the user's feet are situated inside the frame main body 11.

The bicycle according to the embodiments of the invention may be widely applied to transportation applications, recreational applications, sport applications, and the like as a bicycle that allows the user to ride it as if to walk.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A bicycle comprising:
a frame that supports a front wheel and a rear wheel;
a pair of up-and-down links that are respectively provided on a right side and a left side of the frame in a front view;
a pair of pedals that are respectively supported by the pair of up-and-down links; and
a drive unit that drives the rear wheel,
wherein a front end of each link of the pair of up-and-down links is pivotally attached to the frame, and a rear end of each of the pair of up-and-down links is respectively connected to a respective pedal of the pair of pedals,
wherein the drive unit includes a pair of crank arms that are arranged point-symmetrically at an angle of 180° in a front view,
wherein a force that depresses each of the pair of pedals so that the pair of pedals alternately swing downward is transmitted to the pair of crank arms through the pair of up-and-down links, and
wherein the bicycle further comprises a horizontally-holding mechanism that holds each pedal of the pair of pedals approximately horizontally while rotating each of the pair of up-and-down links, and the horizontally-holding mechanism includes a pair of pedal support links that are respectively set up on the pair of pedals, and a pair of horizontally-holding links, the rear end of each respective up-and-down link is pivotally attached to a respective pedal support link at a halfway position, an upper end of each pedal support link of the pair of pedal support links is pivotally attached to one end of a respective horizontally-holding link, and the other end of each of the pair of horizontally-holding links is pivotally attached to the frame.

2. The bicycle as defined in claim 1, wherein:
the pair of horizontally-holding links is biased in an extension direction, and is extendable so that the pair of pedals can be rotated upward and folded.

3. The bicycle as defined in claim 1, further comprising a pair of crank rods that is provided at each free end portion of the pair of the crank arms and extend in a horizontal direction from each free end side of the pair of crank arms, and
wherein each link of the pair of up-and-down links is in direct contact with a respective crank rod of the pair of crank rods.

4. The bicycle as defined in claim 1, wherein the bicycle further comprises a second rear wheel that is supported by the frame.

* * * * *